United States Patent
Kier et al.

(10) Patent No.: US 8,436,788 B2
(45) Date of Patent: May 7, 2013

(54) METHOD AND APPARATUS FOR DISPLAYING

(75) Inventors: Mathew P. Kier, Arlington, VA (US);
Michael J. Dailey, Ashburn, VA (US);
Jon C. Hunter, Fairfax, VA (US);
Richard A. Sanoske, Fairfax, VA (US);
Raymond G Roberts, Montgomery Village, MD (US)

(73) Assignee: Lockheed Martin Corporation, Bethesda, MD (US)

(*) Notice: Subject to any disclaimer, the term of this patent is extended or adjusted under 35 U.S.C. 154(b) by 665 days.

(21) Appl. No.: 12/318,762

(22) Filed: Jan. 8, 2009

(65) Prior Publication Data

US 2009/0184889 A1 Jul. 23, 2009

Related U.S. Application Data

(60) Provisional application No. 61/006,365, filed on Jan. 8, 2008.

(51) Int. Cl.
*G09G 5/00* (2006.01)
*G02B 27/14* (2006.01)
*G03B 21/26* (2006.01)
*F41H 1/04* (2006.01)
*G08B 5/36* (2006.01)
*G02F 1/1335* (2006.01)

(52) U.S. Cl.
USPC ........... 345/7; 345/8; 359/630; 353/28; 2/6.6; 2/6.7; 349/13; 349/14; 340/815.55

(58) Field of Classification Search ............ 345/1.1, 345/1.3, 7–9; 359/630; 353/28; 2/6.6, 6.7; 340/815.55; 349/13, 14
See application file for complete search history.

(56) References Cited

U.S. PATENT DOCUMENTS

| | | | |
|---|---|---|---|
| 3,923,370 A | 12/1975 | Mostrom | |
| 4,897,715 A * | 1/1990 | Beamon, III | 348/115 |
| 5,418,631 A * | 5/1995 | Tedesco | 359/15 |
| 6,057,966 A * | 5/2000 | Carroll et al. | 359/630 |
| 2004/0066547 A1* | 4/2004 | Parker et al. | 359/15 |
| 2005/0248852 A1* | 11/2005 | Yamasaki | 359/630 |
| 2007/0188837 A1 | 8/2007 | Shimizu et al. | |
| 2007/0217018 A1* | 9/2007 | Fredriksson | 359/631 |
| 2008/0289085 A1* | 11/2008 | Bryant et al. | 2/421 |

FOREIGN PATENT DOCUMENTS

EP  0 724 174 A1  7/1996

* cited by examiner

*Primary Examiner* — Jimmy H Nguyen
*Assistant Examiner* — Ilana Spar
(74) *Attorney, Agent, or Firm* — Oblon, Spivak, McClelland, Maier & Neustadt, L.L.P.

(57) ABSTRACT

Aspects of the disclosure provide a display system. The display system can include a display module having a configurable optical characteristic that varies from substantially transmissive to substantially reflective, at least one data capturing device configured to capture data to form a display image, and at least a first projector configured to project the display image to the display module. Therefore, the display image can be overlaid with a real image according to an optical configuration of the display module.

22 Claims, 11 Drawing Sheets

METHOD AND APPARATUS FOR DISPLAYING

INCORPORATION BY REFERENCE

This application claims the benefit of U.S. Provisional Application No. 61/006,365, "Modular Helmet Integrated with Visor and Mountable Devices" filed on Jan. 8, 2008, which is incorporated herein by reference in its entirety.

BACKGROUND

Helmets having audio and visual communication capabilities are available, and are usually designed for a particular usage. For example, helmets with an opaque, reflective visor have been developed for use by pilots of aircraft, such as military jets. Video imaging, such as guidance imaging, night imaging and object tracking, are displayed on the inner surface of the opaque visor to be viewable by the pilot for controlling operations of the aircraft. In addition, the data and voice communication components of the helmet are statically linked to communication infrastructures inside the aircraft. Therefore, the helmet is not suited for modular or dismounted uses in which the individual wearing the helmet desires to see outside the helmet and/or dismount from the aircraft. The costs of such helmets also are impractically expensive for modular and dismounted uses.

Helmets have also been equipped with thermal and night vision (NV) sensors for dismounted use, such as the Rockwell Collins version. However, these existing helmets equipped with thermal and NV sensors rely on the legacy monocular single color display in which the wearer of the helmet views a surrounding area via the sensors through only one eye. Accordingly, the wearer of the helmet does not visually perceive images captured by the thermal and/or NV sensors with both eyes. In addition, the thermal and NV sensors add an uncomfortable weight of approximately five pounds or more to the helmet, and can therefore be cumbersomely large.

SUMMARY

Aspects of the disclosure can provide a display system. The display system can include a display module having a configurable optical characteristic that varies from substantially transmissive to substantially reflective, at least one data capturing device configured to capture data to form a display image, and at least a first projector configured to project the display image to the display module. Therefore, the display image can be overlaid with a real image according to an optical configuration of the display module. For example, when the display module is substantially transmissive, the real image can be clearly viewed. When the display module is substantially reflective, the display image can be clearly viewed. When the display module is partially transmissive and partially reflective, the real image and the display image can be overlapped and viewed.

According to an embodiment of the disclosure, the display module can include a waveguide holographic display. Further, the display module can include a first portion and a second portion that can be configured to have different optical characteristics. The waveguide holographic display can be configured by a waveguide beam according to a mask. The waveguide beam can be provided by the first projector.

According to the disclosure, the at least one data capturing device can include at least one of a video camera, a night vision camera and a thermal vision camera. The display system may include a power supply configured to switchably supply power to the display system.

According to an embodiment of the disclosure, the display system may include a second projector configured to project a different display image.

The display system may be integrated into various devices and used for various applications. Such devices can include, but are not limited to, helmets, windshields, windows, glasses, visors, and the like.

BRIEF DESCRIPTION OF THE DRAWINGS

Various exemplary embodiments of this disclosure will be described in detail with reference to the following figures, wherein like numerals reference like elements, and wherein.

DETAILED DESCRIPTION OF EMBODIMENTS

Figure 1:
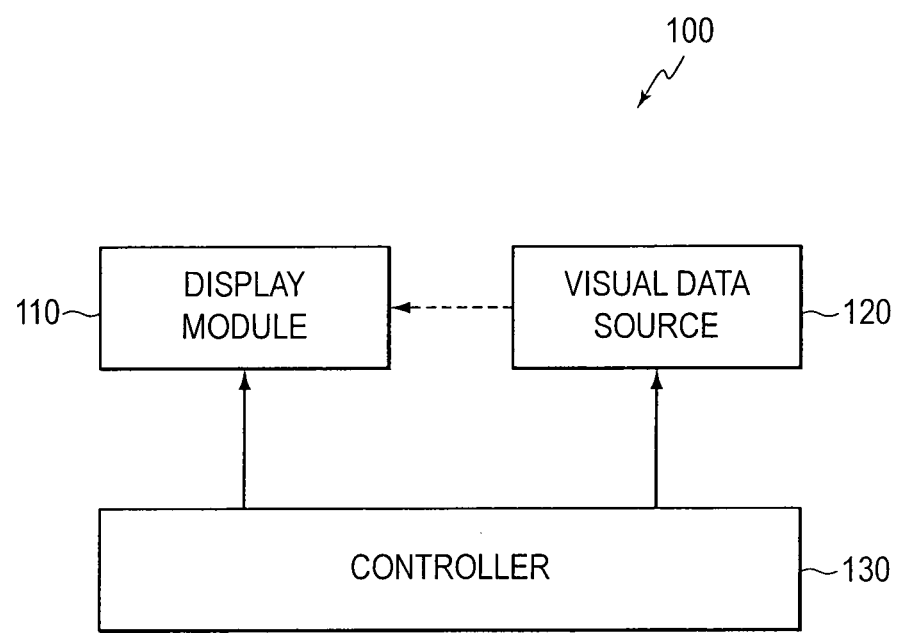
FIG. 1 shows a block diagram of an exemplary display system.

FIG. 1 shows a block diagram of a display system according to an embodiment of the disclosure. The display system 100 may include a display module 110, a visual data source module 120, and a controller module 130. These elements can be coupled together as shown in FIG. 1.

The display module 110 can be a device that can operate in a transparent mode, an opaque mode, and at varying states of transparency in between. For example, the display module 110 can enable an observer to see through and view a scenery image of surroundings. In addition, the display module 110 can enable a display image that is viewable by the observer, while still permitting the observer to view the scenery image of surroundings. In such a mode, the display image is based on visual data from the visual data source module 120, and that is overlapped with the scenery image. Thus, the observer can view both the scenery image and the display image at the same time.

In an embodiment, the display module 110 can be a holographic waveguide module. The holographic waveguide module may include a waveguide layer that may change the transparency of the holographic waveguide module with regard to, for example power level, phase, polarization, and the like, of a waveguide beam. For example, when a power level of the waveguide beam is larger than a threshold, the holographic waveguide module can be reflective, and can display a projected image. On the other hand, when the power level of the waveguide beam is smaller than a threshold, the holographic waveguide module can be transparent, and allow a viewer to see through the holographic waveguide module.

In another embodiment, the display module 110 may be a transparent organic light emitting diode (TOLED) module. The TOLED module can allow a viewer to see through the TOLED and can emit a display image.

The visual data source 120 can generate a display image for displaying on the display module 110. The display image can include visual data from data capturing devices, such as a video camera, a night vision camera sensor, an infrared (IR) illuminator, a laser illuminator, a thermal vision camera sensor, and the like. In addition, the display image may include analysis data, such as real time analysis data, based on the data from the data capturing devices.

The display image can be overlapped with the scenery image of surroundings on the display module 110. In an embodiment, the display system 100 may include a projector module to project the display image on the display module 110. In another embodiment, the display module 110 may include light emitting devices to emit light to form the display image.

The controller module 130 may control the display module 110 and the visual data source module 120 to obtain a desired image for an observer to view via the display system 100. The controller module 130 may configure an operation mode of the display system 100, such as a night mode, a see-through mode, an overlapping mode, and the like. In an embodiment, the controller module 130 and the visual data source module 120 may be integrated in a control and data system.

During operation, the controller module 130 may provide control signals to the visual data source module 120 and the display module 110. The control signals may configure the display system 100 in an operation mode. For example, the control signals may configure the display system 100 in the see-through mode, such that the observer can only view the scenery image. Alternatively, the control signals may configure the display system 100 in the night mode, or the overlapping mode.

The display system 100 can be integrated into various devices and used for many applications. For example, as described above, the display system 100 can be integrated into a helmet, such as a combat helmet, that can provide a user with data that can be combined with real world views. Likewise, the display system 100 can be integrated into a pair of glasses to provide similar functionality to a user. In short, the display system 100 can be integrated into any device where a user's real world views can be supplemented by overlaid data. Such devices can include, but are not limited to, helmets, windshields, windows, glasses, visors, and the like.

Figure 2:
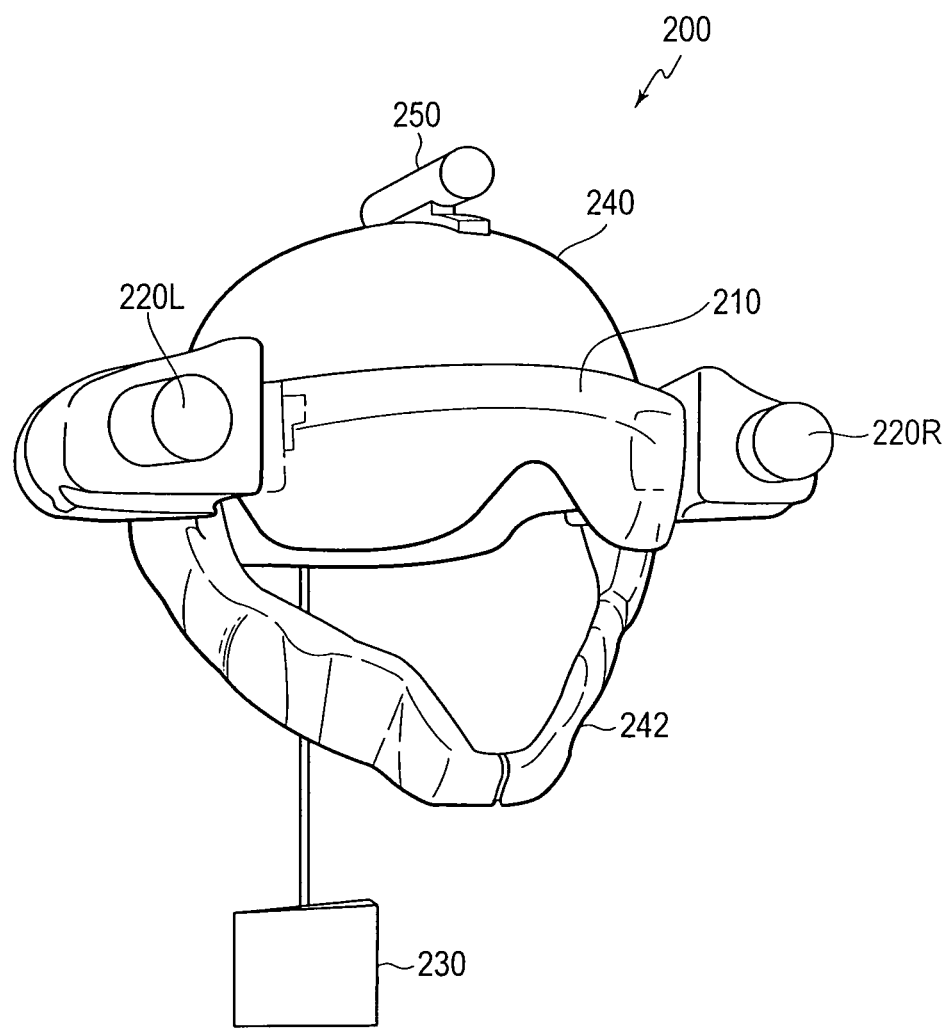
FIG. 2 shows a view of an exemplary helmet integrated with a display system according to the disclosure.

FIG. 2 shows a view of an exemplary helmet integrated with a display system according to an embodiment of the disclosure. The helmet 200 can include a helmet body 240, a visor 210, a plurality of assembled devices 220L, 220R, and 250, and a power and control unit 230. These elements can be coupled together as shown in FIG. 2. In addition, the helmet 200 may include a wear-net (not shown), which can electrically couple these elements together.

The helmet 200 can be used in a mounted or a dismounted configuration. The helmet body 240 can be an existing helmet body, such as those of ground soldiers and/or first responders, for example. The helmet body 240 can also be equipped with a mandible armor 242 configured to protect at least one of a lower surface of the face and the neck of a wearer of the helmet 200. The mandible armor 242 can also include a microphone (not shown) configured to receive audible outputs of the wearer of the helmet 200. Further, the helmet 200 may include a communication module (not shown), which can be integrated with other elements or individually mounted on the helmet 200. The communication module can be configured to transmit the audible outputs received by the microphone to an external reception device.

The visor 210 can be rotatably mounted to a lower surface of the helmet so as to cover both eyes of the wearer of the helmet while rotated into a down position. Alternatively, the visor 210 can also be detached from the helmet as desired. The visor 210 can generally have a spherical shape, as shown in FIG. 2, for example.

The visor 210 can be transparent to the wearer of the helmet 200, thus the wearer of the helmet can freely wear the helmet and not have their vision obscured. The visor 210 also provides eye protection to the wearer. In addition, the visor 210 can have a reflective inner surface. The reflective inner surface of the visor 210 can face the wearer of the helmet 200, and can be configured to have a display image projected thereon by at least one projector. Accordingly, the reflective inner surface of the visor is reflective to the display image projected by the at least one projector.

As described above, the visor 210 can operate in a transparent mode, an opaque mode, and at varying modes in between. For example, in a transparent mode, the wearer of the helmet may be looking at a barren landscape, which the wearer must traverse to get to an objective destination. To assist the wearer, the visor 210 can superimpose navigational data over the view of the landscape. At a simple level, the visor 210 may simply provide textual instruction to the wearer, such as "proceed north-east two miles." In a more sophisticated embodiment, the visor can superimpose graphical instruction, such as a highlighted path over the view of the landscape, such that the wearer should follow to reach their destination.

In an opaque mode, the wearer would only be able to view the data being displayed on the visor 210, as the external real world view would be blocked out. Such a mode can be useful when the wearer is in a secure location, and wants to communicate with others or view information. Because the image viewed by the wearer will not include the real world view, data can be presented to the wearer without the possible distortion from the external real world views.

For various reasons, such as external lighting conditions, it can be necessary to vary the visor 210 between transparent and opaque modes. For example, in exceptionally bright light conditions, in order for the wearer to clearly view the superimposed data displayed in the visor 210, the visor 210 may need to operate in more of an opaque mode, as opposed to when the visor is being used in a low light condition. The mode of the visor 210 can be manually adjusted by the wearer, as well as automatically adjusted by a controller, such as the power and control unit 230.

The power and control unit 230 can be mounted on the helmet 200 and electrically connected to the other devices via the wear-net. The power and control unit 230 can transmit control signals to configure and control the other devices. In addition, the power and control unit 230 may include a battery power supply to support the operation of the other devices. Further, the power and control unit 230 may include switches that can be operated by a wearer of the helmet 200. For example, the wearer of the helmet 200 can operate the switches to selectively power on or off the other devices.

The plurality of assembly devices 220L, 220R, and 250 can be mounted on an outer surface, such as side surface, top surface, and the like, of the helmet 200. In this embodiment, the plurality of assembly devices 220L, 220R, and 250 can be mounted by means of a rail mount that is integrally mounted onto the outer surface of the helmet 200. For example, the rail mount can be a one-inch rail mount onto which the assembly devices can be detachably mounted. Since the surface of the helmet 200 may be curved, the rail mount can be mounted onto an adaptive mounting platform that accommodates the curved surface of the helmet. The adaptive mounting platform in turn can accommodate the substantially flat mounting surface of the rail mount. It should be understood that any suitable permanent or detachable mounting platforms can be incorporated as long as the assembly devices can be reliably mounted to the helmet 200.

The plurality of assembly devices 220L, 220R and 250 may include various data capturing devices, a system processor, and one or more projection devices. The various data capturing devices can include a video camera, a night vision camera sensor, an infrared (IR) illuminator, a laser illuminator, a thermal vision camera sensor, and the like. The data capturing devices can capture data and output the captured data to a system processor.

In an embodiment, the helmet 200 may include a video camera, which can be used to capture images outside of viewing angles of the wearer. In another embodiment, the helmet 200 may include a thermal vision camera sensor, which can be used to detect concealed objects.

In another embodiment, the helmet 200 may include an infrared or laser illuminator mounted on the helmet 200. The infrared or laser illuminator can be configured to illuminate an infrared/laser signal onto an object. In addition, the system processor can generate an icon representing an area on which the infrared signal is illuminated, and output an icon image. The icon image can be projected to the visor 210 to be overlapped with the visual image by the projection devices.

In another embodiment, the helmet 200 may include a global positioning reception device mounted onto an outer surface of the helmet 200. The global positioning reception device can be configured to receive global positioning data corresponding to a location of the helmet 200. The system processor can be configured to generate global positioning coordinates based on the global positioning data received by the global positioning reception device, and output the generated global positioning coordinates to one or more of the projection devices, which are in turn configured to overlay the global positioning coordinates onto the display image projected onto the visor 210.

The system processor can receive captured data from the plurality of data capture devices, process the captured data, and generate data for a display image. The data for the display image can be provided to the projection devices to project on the visor 210. In addition, the system processor may transmit data to an external reception device via a communication unit. For example, the external reception device can be a distant base station or control center, and/or another individual having an appropriate communication device.

The projection devices can be configured to receive the data for the display image from the system processor and project the display image onto the visor 210. The projection devices may include various optical elements to direct, correct, and focus the display image onto the visor 210.

In the example of FIG. 2, the assembly device mounted on one side of the helmet can include a night vision sensor camera, an IR illuminator, and a thermal vision sensor camera, for example. The other side of the helmet can have similar assembly device mounted thereon. In this case, the data capturing devices mounted on both sides of the helmet can collect respective data, and transmit their respective collected data to the system processor, which can in turn transmit the data, in real-time, to the projection devices mounted on the inner surface of the helmet. In this example, the projection device mounted on the right side of the helmet will project the data captured by the data capturing devices mounted on the right side of the helmet, while the projection device mounted on the left side of the helmet will project the data captured by the data capturing devices mounted on the left side of the helmet. Accordingly, it is possible that two different projection devices could project two different display images on left and right sides of the reflective inner surface of the visor 210. For example, the projection device mounted on the left side of the helmet could project a thermal display image captured by a thermal vision sensor camera, while the projection device mounted on the right side of the helmet could project a night vision display image captured by a night vision sensor camera. Alternatively, two projection devices mounted in the helmet 200 could project halves of the display image projected onto the reflective inner surface of the visor 210.

Figure 3:
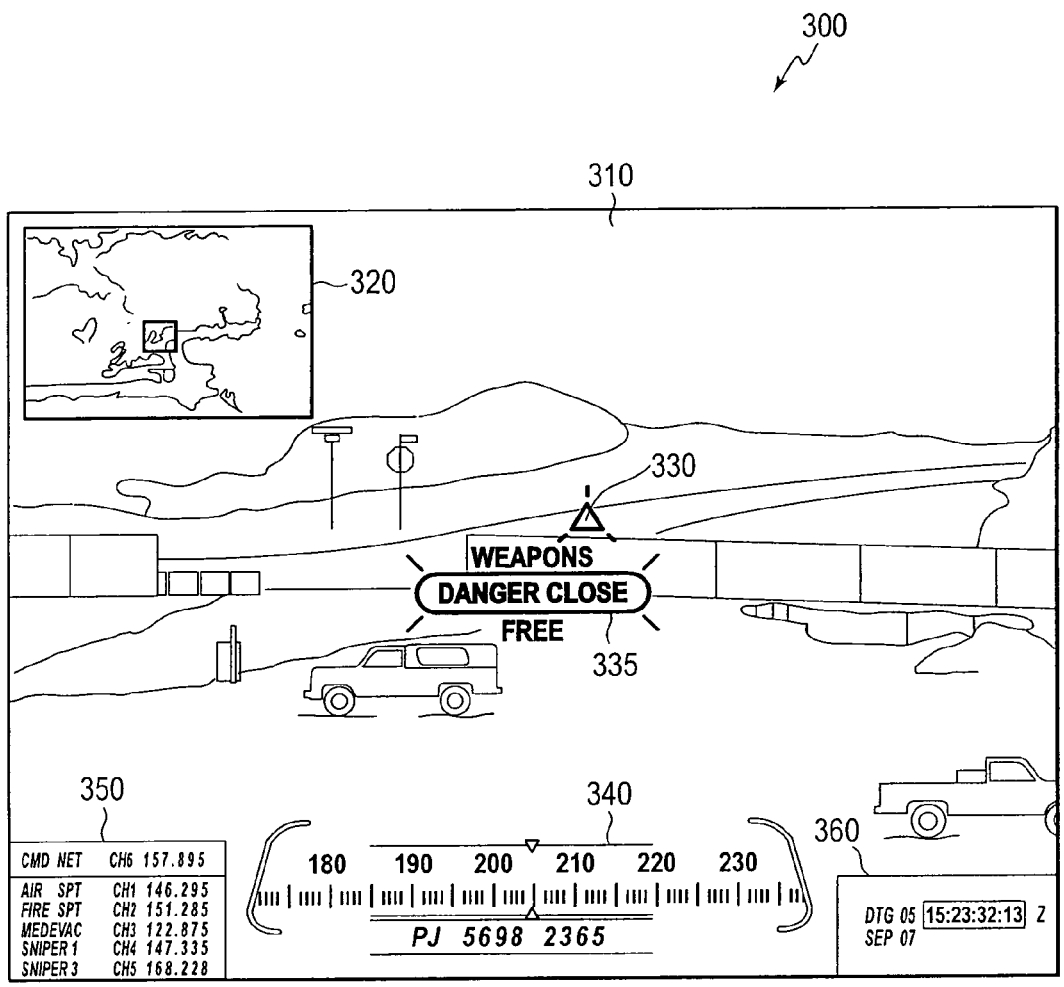
FIG. 3 shows an exemplary overlapped image according to an embodiment of the disclosure.

FIG. 3 shows an exemplary overlapped visual image according to an embodiment of the disclosure. In this example, the visual image 300 may include a scenery background 310, an external video feed display 320, an infrared targeting indicator 330, a fire indicator 335, a compass orientation display 340, a communication channel display 350, and a date-time display 360.

The scenery background 310 can be a scenery image through a display module, such as the visor 210. The external video feed display 320, the infrared targeting indicator 330, the fire indicator 335, the compass orientation display 340, the communication channel display 350 and the date-time display 360 can form a display image that can be projected to a reflective surface of the visor 210, such that the display image and the scenery image can be overlaid, and can be viewed by an observer at the same time.

The display image and the scenery image can be overlaid according to position information of the visor 210, such as location, orientation, height, angle and the like. The position information may be detected by various sensors, or may be received from a remote source.

Figure 4:
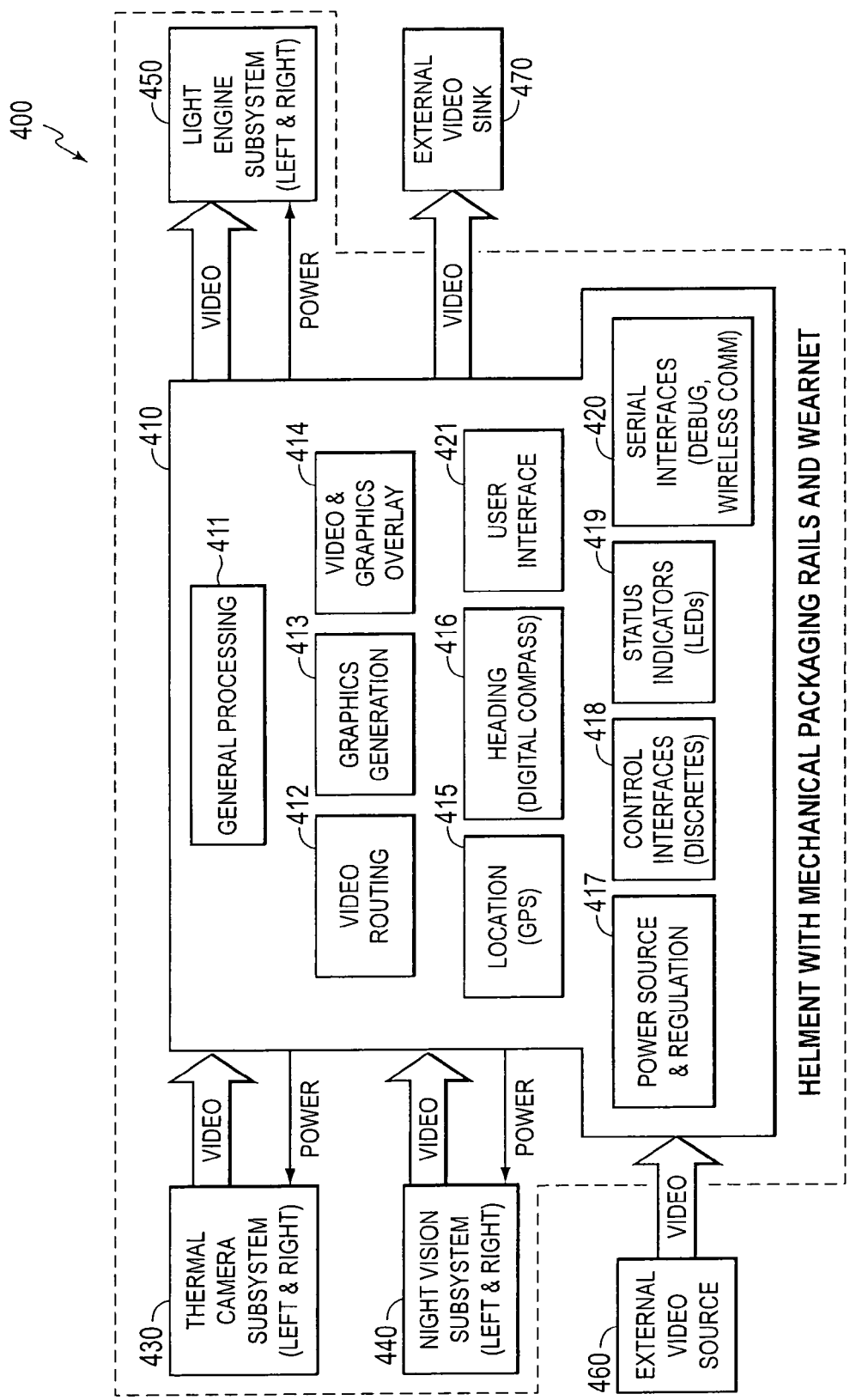
FIG. 4 shows a block diagram of an exemplary control and data system according to an embodiment of the disclosure.

FIG. 4 shows a block diagram of exemplary data processing system 400 according to an embodiment of the disclosure. The data processing system 400 can include a system processor 410, a plurality of data capturing devices 430 and 440, and a light engine 450. These elements can be coupled together as shown in FIG. 4. The data processing system 400 can be integrated on, for example a helmet with mechanical packaging rails and wear-net.

In the example of FIG. 4, the plurality of data capturing devices 430 and 440 may include a thermal camera subsystem 430 and a night vision subsystem 440. The thermal camera subsystem 430 may include a left thermal camera and a right thermal camera. The nigh vision subsystem 440 may include a left night vision camera and a right night vision camera. The plurality of data capturing device 430 and 440 may provide captured data, such as video data to the system processor 410, and may receive control and power signals from the system processor 410.

The system processor 410 can maintain the system and perform data operations. The system processor 410 may further include a general processing module 411, a video routing module 412, a graphic generation module 413, a video and graphic overlap module 414, a location (GPS) module 415, a heading (digital compass) module 416, a power source and regulation module 417, a control interface module 418, a status indicator module 419, a wireless interface module 420, and a user interface module 421.

The general processing module 411 can perform general system maintenance and data operation, such as file system management, interrupt handling, and the like. The video routing module 412 may enable and control data to be transmitted from one module to another module. The graphic generation module 413 can be responsible for generating graphic data corresponding to information to be displayed. For example, the graphic generation module 413 may generate icons for information indicators.

The video and graphic overlap module 414 can be responsible for overlapping video and graphics from multiple modules. The location (GPS) module 415 may be responsible for determining coordinates from data received from a global position reception device. The heading (digital compass) module 416 may be responsible for indicating heading directions. The power source and regulation module 417 may be responsible for managing a power source, such as indicating power level, determining power distributions, and the like.

The control interface 418 may be responsible for outputting control signals to the data capturing devices 430 and 440 and light engine 450. The status indicator module 419 may generate signals to, for example LED indicators, for indicating status of the system. The wireless interface module 420 may be responsible for wireless communication with other system. The user interface module 421 may be responsible for receiving control information from a wearer or a maintaining engineer.

It is noted that the various modules can be implemented as software modules that can be executed by a processor, or can be implemented as hardware modules, such as application specific integrated circuits (ASIC), or can be implemented as a combination of hardware and software. It is also noted that the various modules may be integrated in a chip, or a processing board. Alternatively, the various modules may be distributed in multiple chips or multiple processing boards.

The light engine subsystem 450 may include a left light engine and a right light engine. The light engine subsystem 450 may receive data for a display image from the system processor 410, and may emit light and project the display image to a display module.

Additionally, the data processing system 400 may include an input and output (I/O) interface that can receive video data from an external video source 460, and output video data to an external video sink 470.

Figure 5:
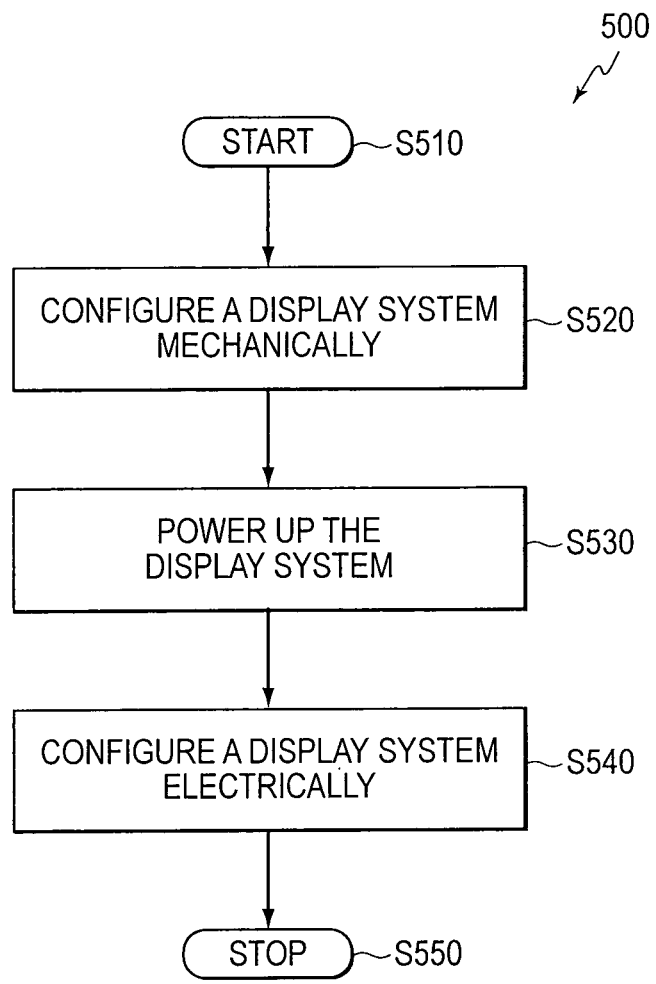
FIG. 5 shows a flowchart outlining an exemplary process for utilizing an exemplary display system according to the disclosure.

FIG. 5 shows a flowchart outlining an exemplary process for using a display system according to the disclosure. The process starts at step S510 and proceeds to step S520.

In step S520, the display system can be configured mechanically. For example, a helmet wearer may mount or dismount one or more devices, such as a thermal camera, a nigh vision camera, a global positioning reception device, and the like, to a helmet. Then, the process proceeds to step S530.

In step S530, the display system can be powered up. In an embodiment, the display system may include a battery power supply that can be manually switched on to provide electrical power to the various devices. In another embodiment, the display system may include a first battery power supply and a second battery power supply. The first battery power supply can be a main battery power supply that can provide electrical power to the display system during operation. The second battery power supply can be a back-up power supply that can provide electrical power to a portion of the display system, such as a monitoring portion. The monitoring portion may monitor activities on the display system, such as plug-in a device, removal of a device, being worn, and the like, and may control the battery power supply based on the monitored activity. For example, when a helmet is not worn, the first battery power supply can be switched off, and when the helmet is worn on a wearer, the first battery power supply can be switched on. Then, the process proceeds to step S540.

In step S540, the display system can be configured electrically. For example, the helmet wearer may configure the display system, which is integrated on the helmet, via a user interface into an operation mode, such as a night mode, a transparent mode, an overlapping mode, and the like. Then, the display system can operate accordingly. The process proceeds to step S550, and terminates.

Figure 6:
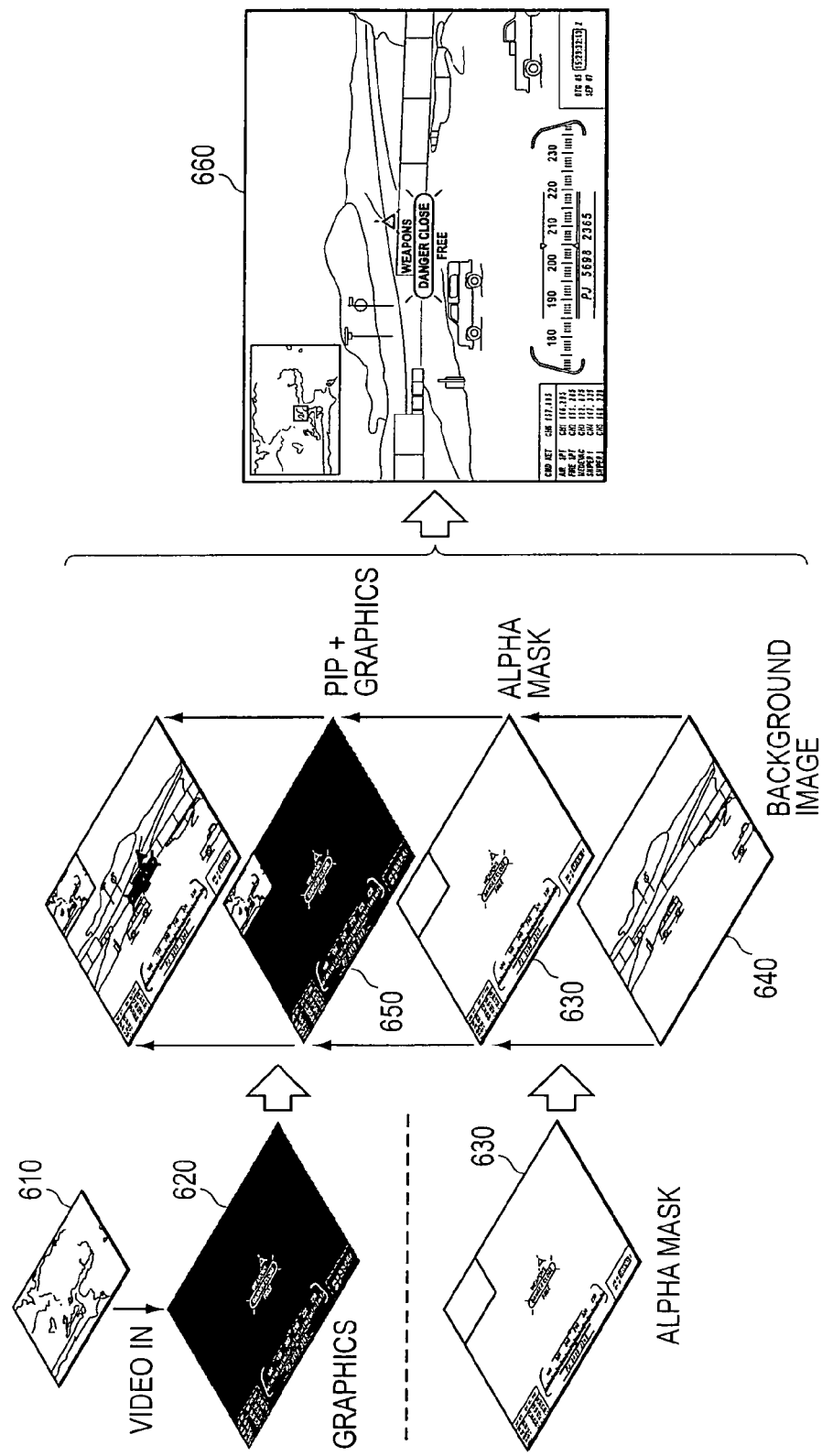
FIG. 6 shows an exemplary image overlapping example of a display system according to the disclosure.

FIG. 6 shows an exemplary image overlapping example of a display system according to the disclosure. The display system may include a system processor, such as the system processor 410, that can receive data captured by data capturing devices, such as video data, location information, indicator information, and the like. The system processor may generate graphics 620, such as icons, indicators, based on the captured data. Further, the system processor may also scale input video images 610 to fit into a portion of a display image, such as in a picture in picture (PIP) configuration. The system processor may overlap the scaled video image with the graphics to form a display image 650.

Additionally, according to an embodiment of the disclosure, the system processor may generate a mask 630, such as a transparency mask or an alpha mask, based on the display image 650. The mask 630 can be used to block transparency on portions of the display module. For example, the mask can be used to determine power levels of a waveguide beam for masked portions and non-masked portions of a holographic waveguide module.

Further, the display image 650, the mask 630 can be projected to a display module, such as the visor 210. The mask 630 may result in opaque regions at masked portions of the display module, thus an observer can view the display image 650 at the masked portions. In addition, the non-masked portion can be transparent, and the observer can view the background through the non-masked portion. Therefore, the observer can view the display image and the background image at the same time.

Figure 7:
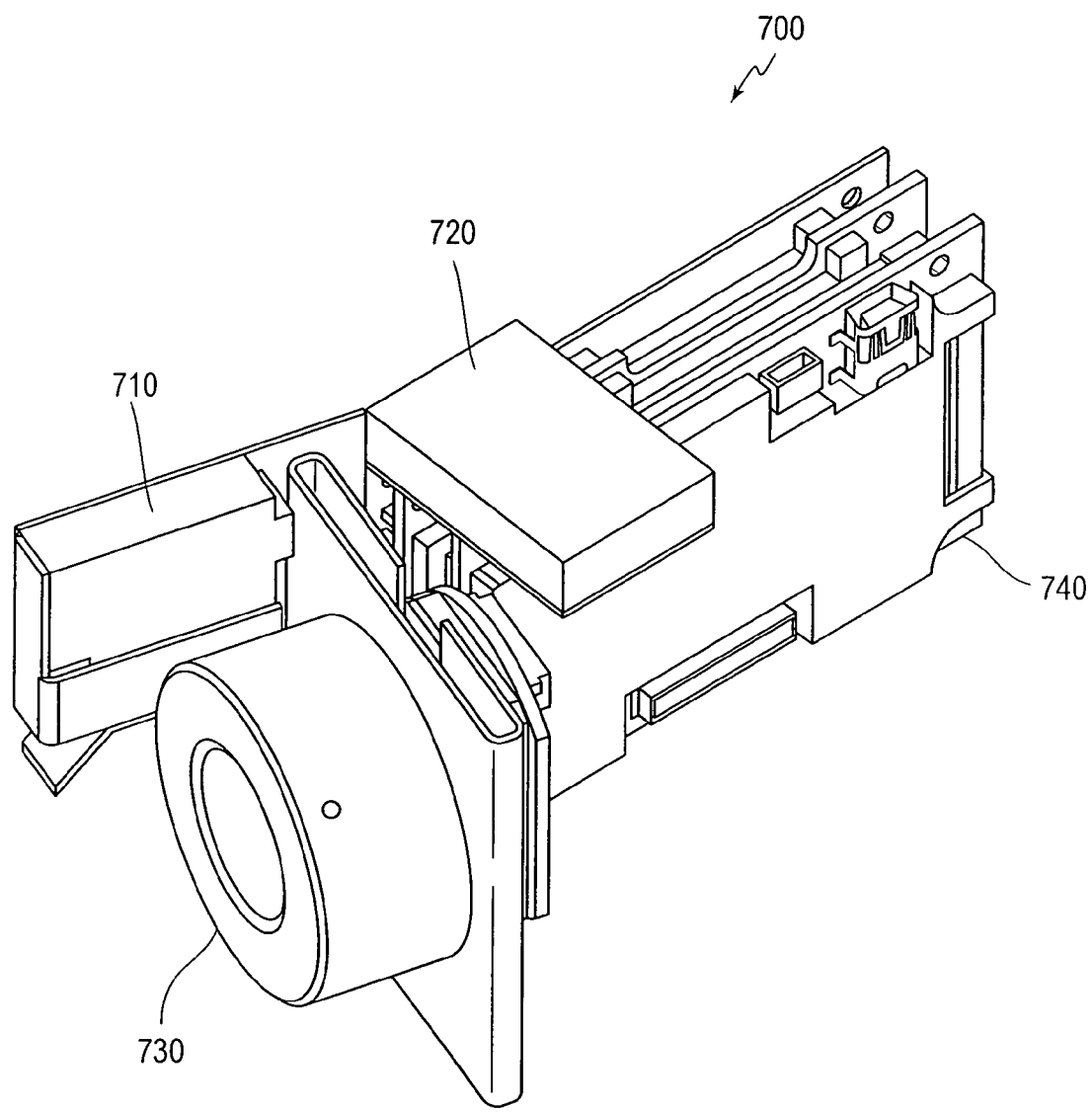
FIG. 7 shows a bracket assembly example.

FIG. 7 shows a bracket assembly example. The bracket assembly 700 may include a projector 710, a projector processing board 720, a thermal sensor 730, and a thermal imaging processing board 740. These elements can be assembled together as shown in FIG. 7.

The projector 710 and the projector processing board 720 can be electrically coupled together. The projector 710 may project a display image to a display module. The projector processing board 720 can provide data for the display image.

The thermal sensor 730 and the thermal imaging processing board 740 can be electrically coupled together. The thermal sensor 730 may generate signals corresponding to thermal characteristics of surroundings. The signals can be provided to the thermal imaging processing board 740 to generate a thermal image of surroundings. The thermal image can be provided to the projector processing board 720 to be projected on the display module.

In an embodiment, two bracket assemblies 700 may be mounted in a display system, such as 220L and 220 R in FIG. 2. It is noted that the bracket assembly 700 may include other suitable devices, such as a night vision camera, and the like.

Figure 8:
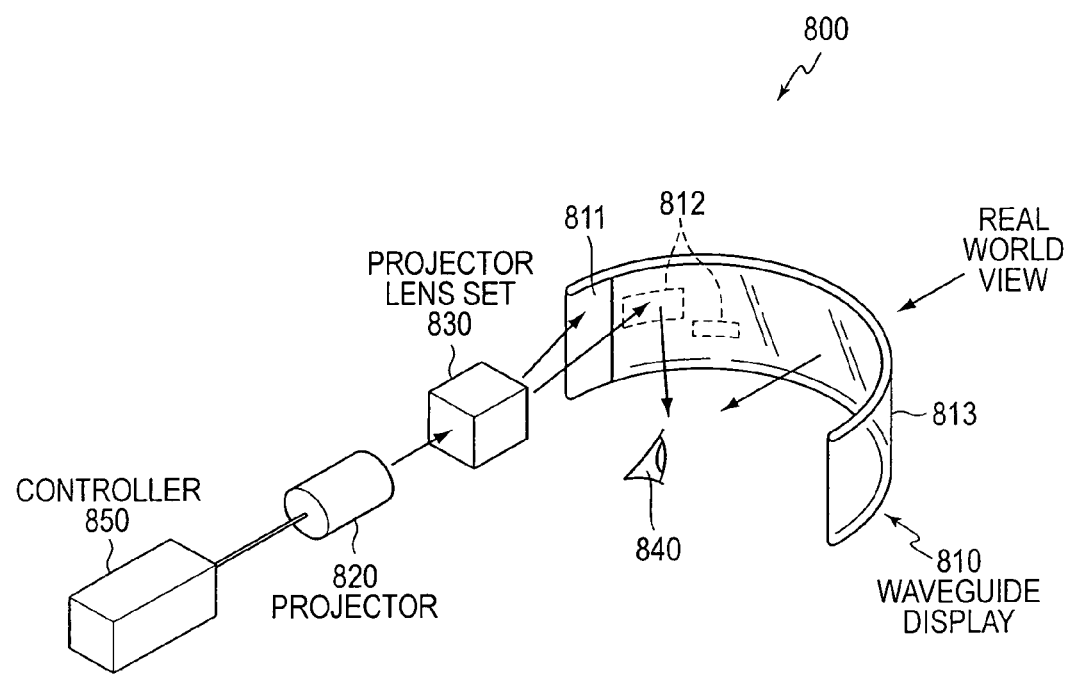
FIG. 8 shows a projector-display system example according to the disclosure.

FIG. 8 shows an exemplary projector-display system 800 example according to the disclosure. The projector-display system 800 can include a waveguide holographic display 810, a projector light source 820, a projector lens set 830, and a controller 850. These elements can be coupled together as shown in FIG. 8.

The waveguide holographic display 810 may include a waveguide portion 811, and a display portion 812-813. The display portion 812-813 may further include a holographic image portion 812, and a real world view portion 813. The waveguide portion 811 can vary optical characteristics, such as transmissive characteristic, reflective characteristic, and the like, of the display portion 812-813. In an embodiment, the waveguide portion 811 can respectively vary the optical characteristics of the holographic image portion 812 and the real world view portion 813. In another embodiment, the waveguide portion 811 can vary the optical characteristics of the display portion 812-813 altogether.

The optical characteristics may be varied according to a waveguide beam. The waveguide beam can be provided by the projector light source 820 and the projector lens set 830. Additionally, the projector light source 820 and the projector lens set 830 may direct a display image to the waveguide holographic display 810. In an embodiment, the projector-display system 800 can be configured as a front projection system. In another embodiment, the projector-display system 800 can be configured as a rear projection system.

The controller 850 may include an image processing module that can provide image data for the projector light source 820 and the projector lens set 830 to project the display image. In addition, the controller 850 may include a control module that can control the projector light source 820 and the projector lens set 830 to generate an appropriate waveguide beam to vary the optical characteristics of the waveguide holographic display 810. Accordingly, a display image and a real world view can be observed by an observer at position 840.

Figure 9:
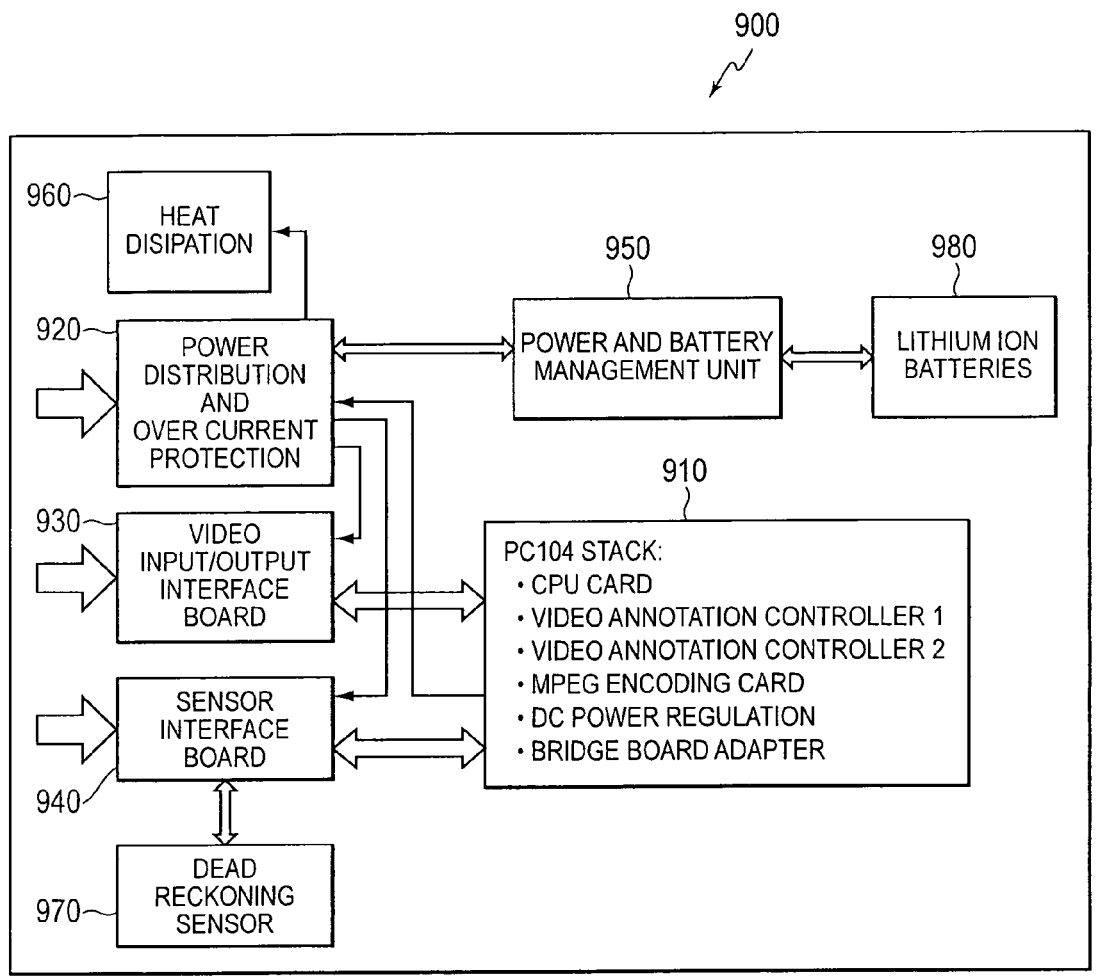
FIG. 9 shows a block diagram of a video processor system example according to an embodiment of the disclosure.

FIG. 9 shows a block diagram of a video processor system example 900 according to an embodiment of the disclosure, which can be an implementation of the system processor 410. The video processor system 900 can include a stack of electronics, such as a PC104+ stack 910 according to PC104 mobile electronics standard, a power distribution and over current protection unit 920, a video input/output interface board 930, a sensor interface board 940, a power and battery management unit 950, a heat dissipation unit 960, a dead reckoning sensor unit 970, and a lithium ion battery 980. These elements can be coupled together as shown in FIG. 9.

According to the disclosure, the total video processor system 900 may consume a reduced power, for example less than 10 W, while running at full load, and can display multiple simultaneous video inputs in real-time, such as 30 fps, without any noticeable latency.

The PC104+ stack 910 can provide a common backplane for multiple electronics to power up and communicate. The PC104+ stack 910 may include a central processing unit (CPU) card, such as Advanced Micro Peripherals Micro886, which features Transmeta 800 Mhz x86 processor for full Desktop application compatibility. The CPU card may include various ports, such as integrated drive electronics (IDE), universal serial bus (USB), PS/2 keyboard, PS/2 mouse, 2x RS232, parallel port, and the like.

Further, the PC104+ stack 910 can include a plurality of video annotation controller cards, such as Advanced Micro-Peripherals VAC-104+. Each video annotation controller card can drive an output display, for example in both video graphics adapter (VGA) and national television standards committee (NTSC) output formats. Each card can also provide two separate decoders for real-time NTSC video input decoding over 4 channels each. The video annotation controller cards can also provide an application programming interface (API), such as C language API, for managing the hardware accelerating video processing and windowing.

In addition, the PC104+ stack 910 may include a moving picture experts group (MPEG) encoding card, such as Advanced MicroPeripherals MPEG4000. The MPEG encoding card can enable hardware encoding of video inputs for portable recording and low-bandwidth transmission of video.

The PC104+ stack 910 may also include a DC power regulation card, such as HE+104, which can regulate battery power to, for example, all required voltages in the system, and a bridge board adapter, such as Advance Microperipherals BridgeBoard2000, which can allow for changing the form factor of a stack to a wider and shorter configuration and providing a slot for compact flash to IDE adapter.

The power distribution and over current protection unit 920 can provide an interface for external power input for battery charging and regulated power distribution via a fused distribution panel to, for example, all system components requiring regulated power.

The power and battery management unit 950 can manage the charging of lithium-ion batteries and to supply power from them. For example, the power and battery management unit 950 can supply power evenly to the system without dangerous uneven discharge which leads to a runaway condition that can lead to catastrophic battery failure.

The heat dissipation unit 960 can include mechanisms to conduct and dissipate heat. For example, the heat dissipation unit 960 may include an all aluminum enclosure for heat conduction and dissipation to the atmosphere. In addition, the heat dissipation unit 960 may include a plurality of fans to provide airflow out of the enclosure to prevent hot air from being trapped within the confines of the system.

The dead reckoning sensor unit 970, such as DRM4000 from Honeywell, can provide precision inertial sensing and precise global position when connected to a GPS sensor. The lithium ion battery 980 can provide electrical power to the system.

Figure 10:
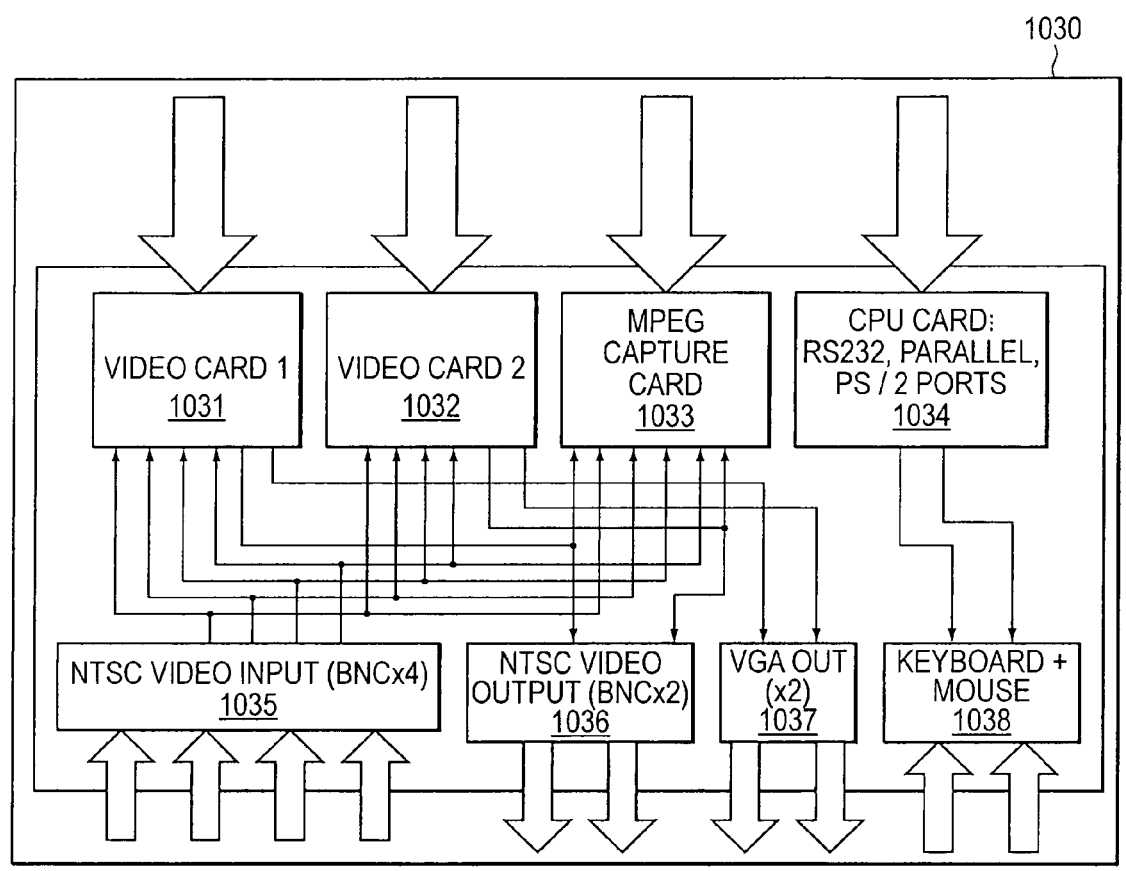
FIG. 10 shows a block diagram of a video input/output interface board example according to an embodiment of the disclosure.
Figure 11:
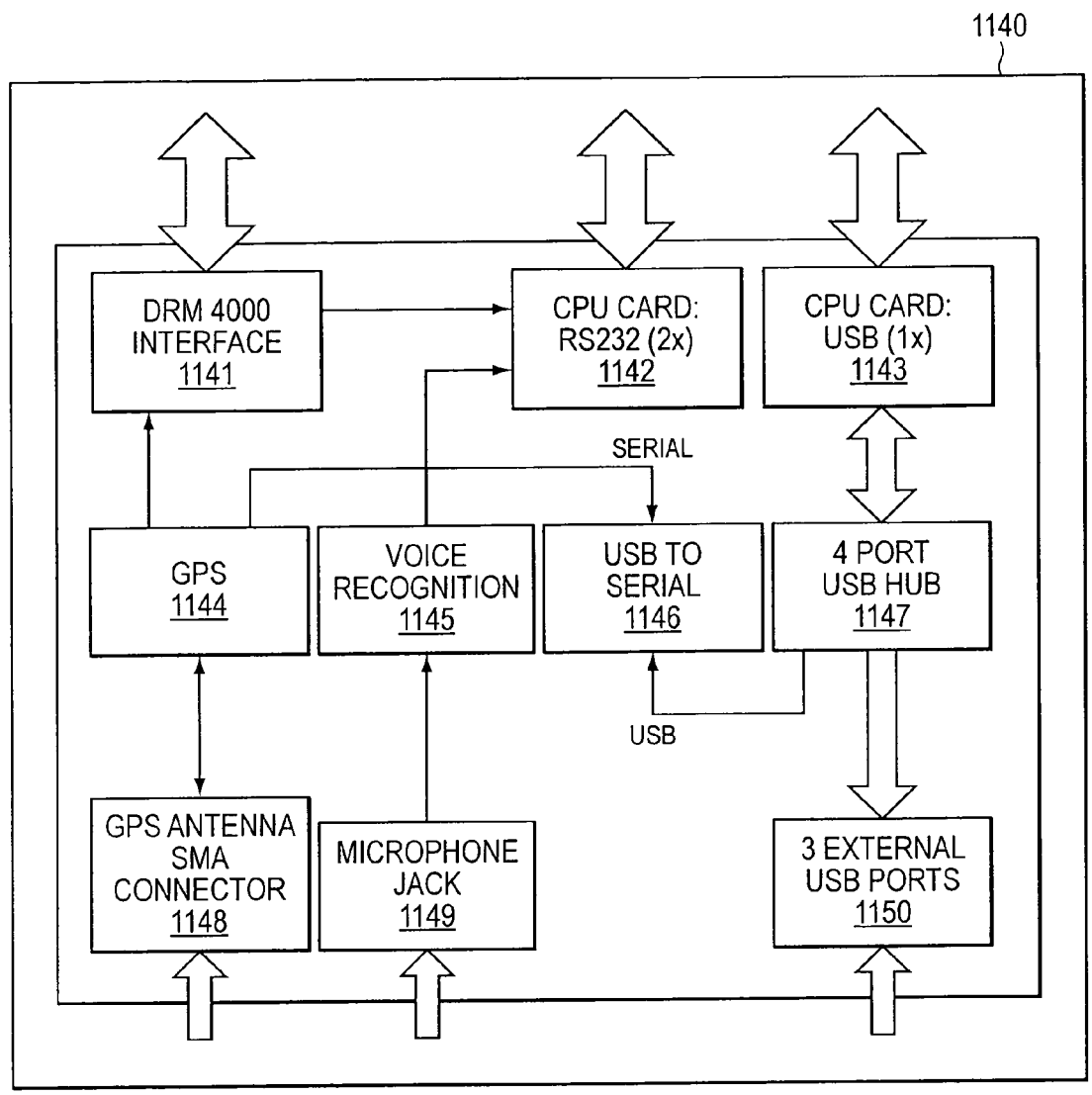
FIG. 11 shows a block diagram of a sensor interface board example according to an embodiment of the disclosure.

The video input/output interface board 930 and the sensor interface board 940 can be described with regard to embodiments shown in FIG. 10 and FIG. 11.

FIG. 10 shows a block diagram of a video input/output (IO) interface board example according to an embodiment of the disclosure. The video IO interface board 1030 can include various interfaces, such as video card interfaces 1031 and 1032, MPEG card interface 1033, CPU card interface 1034, NTSC video input interface 1035, NTSC video output interface 1036, VGA output interface 1037, PS/2 interface 1038, and the like. The video IO interface board 1030 can serve as a breakout board for coupling the video annotation controller video inputs and outputs into a set of accessible connectors.

The video card interfaces 1031 and 1032 can provide connectors for the video annotation controller cards. The NTSC video input interface 1035 and output interface 1036 can provide connectors, such as BNC connectors, for NTSC video inputs and outputs. The VGA output interface 1037 can provide VGA interface to the video annotation controllers. The PS/2 interface can provide connection to a keyboard and a mouse.

The video 10 interface board 1030 can also provide routings as shown in FIG. 10, between the various interfaces. For example, the video IO interface board can route all video inputs to the MPEG encoding board. Thus, the NTSC video outputs can be routed back to the MPEG encoding board for recording, and can be used for future reference.

FIG. 11 shows a block diagram of a sensor interface board example according to an embodiment of the disclosure. The sensor interface board 1140 can serve as an integration circuitry for various sensors, such as GPS antenna 1148 with GPS processing unit 1144, microphone 1149 with voice recognition unit 1145, and the like. Further, the sensor interface board 1140 can provide additional ports. For example, the sensor interface board 1140 can expand a single USB port 1146 to four USB ports 1147.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A display system, comprising:
   a display module including a waveguide holographic display, the waveguide holographic display having a continuously reconfigurable optical characteristic that varies from substantially transmissive for viewing real images to substantially reflective for viewing display images;
   at least one data capturing device configured to capture data to form a display image;
   a controller configured to control the optical characteristic of the waveguide holographic display;
   at least a first projector configured to project the display image to the display module, such that the display image is overlapped with a real image according to an optical configuration of the display, wherein
   the controller automatically controls the optical characteristic of the waveguide holographic display based on ambient conditions of an external environment and the optical characteristic is substantially transmissive when a power level of the waveguide beam is below a non-zero threshold and is substantially reflective when the power level is above the non-zero threshold.

2. The display system according to claim 1, wherein the display module further comprises a first portion and a second portion configured to have different optical characteristics.

3. The display system according to claim 2, wherein the first portion and the second portion are configured according to a mask.

4. The display system according to claim 3, further comprising:
   a processor configured to process the captured data, and generate the display image and the mask.

5. The display system according to claim 1, wherein the data capturing device comprises at least one of a video camera, a night vision camera and a thermal vision camera.

6. The display system according to claim 1, further comprising:
   a power supply configured to switchably supply power to the display system.

7. The display system according to claim 1, further comprising:
   a second projector configured to project a different display image.

8. A helmet, comprising:
   a visor mounted on the helmet, the visor including a waveguide holographic display, the waveguide holographic display having a continuously reconfigurable optical characteristic that varies from substantially transmissive for viewing real images to substantially reflective for viewing display images;
   at least one data capturing device mounted on the helmet, and configured to capture data to form a display image; and
   a controller configured to control the optical characteristic of the waveguide holographic display;
   at least a first projector mounted on the helmet, and configured to project the display image to the visor, such that the display image is overlapped with a real image according to an optical configuration of the visor, wherein
   the controller automatically controls the optical characteristic of the waveguide holographic display based on ambient conditions of an external environment and the optical characteristic is substantially transmissive when a power level of the waveguide beam is below a non-zero threshold and is substantially reflective when the power level is above the non-zero threshold.

9. The helmet according to claim 8, wherein the visor further comprises a first portion and a second portion configured to have different optical characteristics.

10. The helmet according to claim 9, wherein the first portion and the second portion are configured according to a mask.

11. The helmet according to claim 10, further comprising:
    a processor configured to process the captured data, and generate the display image and the mask for configuring the visor.

12. The helmet according to claim 8, wherein the data capturing device comprises at least one of a video camera, a night vision camera and a thermal vision camera.

13. The helmet according to claim 8, further comprising:
    a battery power supply configured to switchably supply electrical power.

14. The helmet of claim 8, further comprising:
    an infrared illuminator detachably mounted on the helmet, configured to illuminate an infrared signal onto an object, wherein the display image includes a generated icon for a position of the object.

15. The helmet of claim 8, further comprising:
    a global positioning reception device detachably mounted on the helmet and configured to receive global positioning data corresponding to a location of the helmet, wherein the display image includes the global positioning data.

16. The helmet of claim 8, further comprising:
    a mandible armor configured to protect at least the neck of a wearer of the helmet.

17. The helmet of claim 16, wherein the mandible armor comprises a microphone configured to receive audible outputs from the wearer of the helmet.

18. The helmet of claim 17, further comprising:
    a communication unit detachably mounted onto an outer surface of the helmet and configured to wirelessly communicate with an external device.

19. The helmet of claim 8, comprising:
    two projectors respectively mounted on opposing sides of the helmet.

20. The helmet of claim 19, wherein the two projectors are each configured to project opposing halves of the display image projected onto the visor.

21. The display system according to claim 1, wherein the first projector is configured to project a waveguide beam to configure the waveguide holographic display.

22. The helmet according to claim 8, wherein the first projector is configured to project a waveguide beam to configure the waveguide holographic display.

* * * * *